United States Patent Office 3,292,255
Patented Dec. 20, 1966

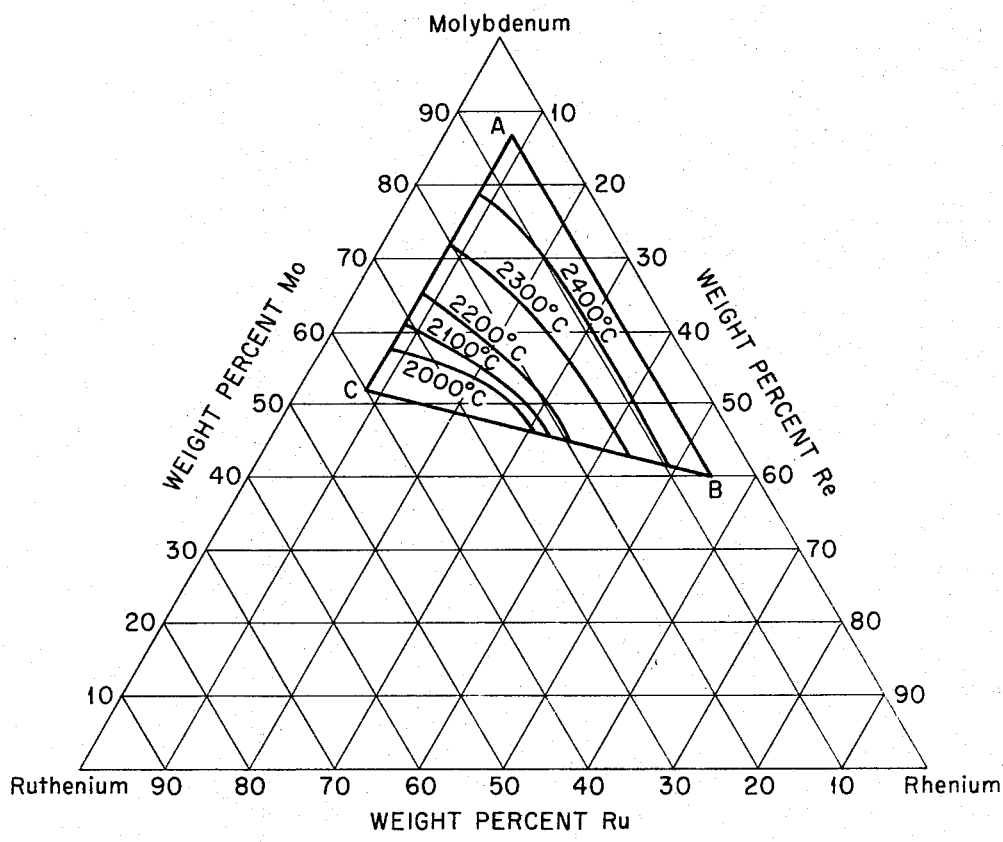

3,292,255
BRAZING ALLOYS FOR TUNGSTEN AND MOLYBDENUM
James C. Marshall and Harlos G. Smith, both of Cincinnati, Ohio, assignors to the United States of America as represented by the United States Atomic Energy Commission
Filed June 25, 1964, Ser. No. 397,352
2 Claims. (Cl. 29—494)

Our invention relates to brazing of refractory metals and more particularly to brazing alloys for joining tungsten, molybdenum and their alloys.

The refractory metals tungsten and molybdenum and their alloys are useful for high-temperature applications in the nuclear energy and space fields. Many of these applications require sealing or closure joints and/or structural joints for attaching to support hardware. Tungsten and molybdenum have been joined by welding and diffusion bonding as well as brazing, but numerous joint configurations and tolerances are encountered such that brazing is the only practical method.

Satisfactory brazing alloys are available for low and moderate temperatures, but not for the temperature range of particular interest for certain nuclear reactor components, that is, 1950° C. to 2500° C. At these temperatures available brazing alloys tend to erode the base metal or exhibit poor flow characteristics due to volatilization of alloy constituents during brazing. It is desired to provide a brazing alloy system which allows selection of a particular composition for a given temperature within this range. Other desired features for the brazing alloy system are a rapid increase in remelt temperature to provide high-temperature service capability and a body-centered cubic structure to prevent embrittling phases from being formed during diffusion in service.

It is therefore an object of our invention to provide a brazing alloy system for joining tungsten, molybdenum and their alloys.

Another object is to provide a brazing alloy system for said metals which allows selection of a particular brazing temperature within the range of 1950° C. to 2500° C.

Another object is to provide a method of brazing tungsten, molybdenum and their alloys at a temperature of 1950° C. to 2500° C.

Other objects and advantages of our invention will be apparent from the following detailed description and claims.

In accordance with our invention tungsten, molybdenum and alloys containing a predominant proportion thereof are joined to themselves and to one another by brazing with an alloy of the composition 40 to 87 weight percent molybdenum, 5 to 40 weight percent ruthenium and 8 to 55 weight percent rhenium, said alloy composition being further limited to the area bounded by the triangle ABC in the accompanying figure. This alloy system allows the selection of a brazing temperature in the range of 1950° C. to 2500° C. Erosion of base metal is slight, and no intermediate diffusion products are formed between the base metal and the brazing alloy. Remelt temperature increase at the joint is relatively rapid, and the joint is useful for service at temperatures up to 2500° C.

The brazing alloy compositions included within the scope of this invention are depicted graphically as the area bounded by the triangle ABC in the accompanying figure, which is a ternary diagram of the molybdenum-ruthenium-rhenium system. Lines of constant brazing temperature are shown within the area covered. Compositions for a given brazing temperature may be selected by reference to these lines.

The ruthenium and rhenium levels in the alloys of our invention are limited as indicated above because of a sigma phase intermetallic which is formed in excessive amounts at higher levels.

The brazing alloys within the scope of our invention may be fabricated and added to the joint by conventional powder techniques. Specialized techniques such as the use of powder metallurgy preforms are also applicable. Brittleness in these brazing alloys, which necessitates handling in powder form, does not cause brittleness in the resulting joint structure.

Brazing with these alloys may be effected by conventional techniques. The parts to be joined are positioned in abutting relationship with the brazing alloy at the joint. The assembly is then heated to the brazing temperature under non-oxidizing conditions. An atmosphere of reducing gas such as hydrogen, an inert gas or a vacuum may be employed. Complete flow of the brazing alloy at the joint surface is normally obtained by holding at temperature for a period of about 5 minutes. Thicker or larger parts may require a longer heating period. The assembly is then cooled in the absence of oxygen.

The brazing alloy system and method described above are applicable to joining tungsten, molybdenum, and alloys containing a predominant proportion, that is, over 50 weight percent, thereof to themselves and one another. Examples of alloys which may be joined by this means are tungsten—26 weight percent rhenium and molybdenum—50 weight percent rhenium.

Our invention is further illustrated by the following specific example.

EXAMPLE

A series of brazing tests was conducted using alloys in the system described above. In each test a specimen of brazing alloy was placed adjacent the joint line of a tungsten T section. The T section assembly was then heated in a resistance furnace to 1650° C. in helium. The helium was purged out with hydrogen at this temperature and the T section was heated to a predetermined temperature, held for five minutes, and cooled to 1650° C. in the hydrogen atmosphere. At this time the hydrogen was purged by helium and cooling was continued to room temperature. A heating rate of 100° F. per minute was normally maintained. The T sections were examined visually for extent of melting and flow and metallographically for fillet porosity, cracking and erosion. These tests were repeated in 25–50° C. intervals until the brazing temperature was determined.

The brazing temperature for the various alloy compositions may be seen by reference to the following table.

Table.—Brazing temperatures for alloys in the Mo-Re-Ru system

| Composition, weight percent: | Brazing temperature, ° C. |
|---|---|
| Mo-10Re-20Ru | 2300 |
| Mo-10Re-12Ru | 2400 |
| Mo-10Re-15Ru | 2350 |
| Mo-25Re-20Ru | 2250 |
| Mo-25Re-15Ru | 2300 |
| Mo-20Re-15Ru | 2325 |
| Mo-20Re-12Ru | 2400 |
| Mo-10Re-10Ru | 2425 |
| Mo-10Re-35Ru | 1950 |
| Mo-25Re-25Ru | 1950 |
| Mo-48Re-10Ru | 2400 |
| Mo-40Re-15Ru | 2250 |

A good joint, with no apparent erosion of the base metal, was obtained for each of these alloys.

The above example is merely illustrative and is not to be understood as limiting the scope of our invention which is limited only as indicated by the appended claims.

Having thus described our invention, we claim:

1. The method of joining tungsten, molybdenum and alloys containing a predominant proportion of said metals to themselves and to one another which comprises disposing surfaces of the parts to be joined in abutting relationship with a brazing alloy disposed adjacent said abutting surface, said brazing alloy consisting of 40 to 87 weight percent molybdenum, 5 to 40 weight percent ruthenium and 8 to 55 weight percent rhenium, the composition of said brazing alloy being further limited to the area bounded by ABC in the accompanying figure, heating the resulting assembly to brazing temperature in the range of 1950° C. to 2500° C. under non-oxidizing conditions and cooling the resulting brazed joint.

2. A brazing alloy for joining the metals tungsten, molybdenum, and alloys containing at least 50 percent of said metals to themselves and to one another, said brazing alloy consisting of 40 to 87 weight percent molybdenum, 5 to 40 weight percent ruthenium, and 8 to 55 weight percent rhenium, the composition of said brazing alloy being further limited to the area bounded by the triangle ABC in the accompanying figure, said brazing alloy being characterized by its ability to join said metals and alloys at a joint forming temperature from 1950° C. to 2500° C. with minimal erosion to said metals and alloys while forming a body-centered cubic grain structure for preventing the formation of joint embrittling phases, and a joint remelt temperature that rapidly increases to a temperature greater than the brazing temperature for rendering the joined metals and alloys serviceable at temperatures at least as great as the brazing temperature.

References Cited by the Examiner

UNITED STATES PATENTS

| | | | |
|---|---|---|---|
| 1,647,301 | 11/1927 | Ledig | 75—176 |
| 2,844,868 | 7/1958 | Cline et al. | 29—504 |
| 3,110,101 | 11/1963 | Kieffer | 75—176 X |
| 3,220,828 | 11/1965 | Kaarlela | 75—176 X |

DAVID L. RECK, *Primary Examiner.*

HYLAND BIZOT, *Examiner.*

C. N. LOVELL *Assistant Examiner.*